US012783038B2

(12) United States Patent
Yang et al.

(10) Patent No.: US 12,783,038 B2
(45) Date of Patent: Nov. 3, 2026

(54) MODE SWITCHING METHOD, TERMINAL DEVICE, AND STORAGE MEDIUM

(71) Applicant: GUANGDONG OPPO MOBILE TELECOMMUNICATIONS CORP., LTD., Dongguan (CN)

(72) Inventors: Yulin Yang, Dongguan (CN); Lifeng Chen, Dongguan (CN); Zhaojin Wang, Dongguan (CN); Hongwei Du, Dongguan (CN); Ansheng Ma, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 12 days.

(21) Appl. No.: 18/914,447

(22) Filed: Oct. 14, 2024

(65) Prior Publication Data

US 2025/0036182 A1 Jan. 30, 2025

Related U.S. Application Data

(63) Continuation of application No. PCT/CN2022/141947, filed on Dec. 26, 2022.

(30) Foreign Application Priority Data

Apr. 14, 2022 (CN) ........................ 202210390676.0

(51) Int. Cl.
*G06F 1/3206* (2019.01)

(52) U.S. Cl.
CPC .................................. *G06F 1/3206* (2013.01)

(58) Field of Classification Search
CPC .......... G06F 1/3206; G06F 1/329; G06F 9/48; G06F 9/4893; Y02D 30/70
See application file for complete search history.

(56) References Cited

U.S. PATENT DOCUMENTS 10,083,018 B1 * 9/2018 Rizea ...................... H04L 67/56
2012/0159144 A1 * 6/2012 Sengupta ............... G06F 9/441 713/100

(Continued)

FOREIGN PATENT DOCUMENTS

CN 105204931 A 12/2015
CN 106604369 A 4/2017

(Continued)

OTHER PUBLICATIONS

International Search Report and Written Opinion, International Application No. PCT/CN2022/141947, mailed Feb. 9, 2023 (14 pages).

(Continued)

*Primary Examiner* — Michael Alsip
(74) *Attorney, Agent, or Firm* — Ladas & Parry LLP

(57) ABSTRACT

A mode switching method, a mode switching apparatus, a terminal device, and a storage medium are provided. A first operating system and a second operating system are at least installed in the terminal device. A power consumption of the first operating system in a normal operating state is greater than that of the second operating system. The method includes: if a scenario change notification for the terminal device is received, obtaining target scenario information corresponding to a changed scenario; and in response to the target scenario information meeting a mode switching condition corresponding to the scenario change notification, switching the terminal device from the current operating mode that is currently in operation to a target operating mode. The operating state and the operating power consumption of the first operating system in the current operating mode are different from those of the first operating system in the target operating mode.

16 Claims, 5 Drawing Sheets

(56) References Cited

U.S. PATENT DOCUMENTS

| | | | | |
|---|---|---|---|---|
| 2015/0365892 | A1* | 12/2015 | Ma | H04W 52/0209 455/574 |
| 2016/0139936 | A1 | 5/2016 | Sengupta et al. | |
| 2018/0024615 | A1* | 1/2018 | Cui | G06F 1/3206 713/2 |

FOREIGN PATENT DOCUMENTS

| | | | |
|---|---|---|---|
| CN | 106707735 | A | 5/2017 |
| CN | 112835413 | A | 5/2021 |
| CN | 112987907 | A | 6/2021 |
| CN | 113535342 | A | 10/2021 |
| CN | 114665916 | A | 6/2022 |

OTHER PUBLICATIONS

First Office Action, Chinese Application No. 202310135173.3, mailed Jun. 1, 2026 (39 pages).

* cited by examiner

MODE SWITCHING METHOD, TERMINAL DEVICE, AND STORAGE MEDIUM

CROSS REFERENCE TO RELATED APPLICATIONS

This application is a continuation of International Patent Application No. PCT/CN2022/141947, filed Dec. 26, 2022, which claims the priority of Chinese Patent Application No. 202210390676.0, filed Apr. 14, 2022, both of which are herein incorporated by reference in their entireties.

TECHNICAL FIELD

The present disclosure relates to the field of electronic device technologies, and in particular to a mode switching method, a terminal device and a storage medium.

BACKGROUND

Nowadays, multiple processor cores may be provided on a terminal device (e.g., a cell phone, a tablet computer, a smart wearable device, etc.). Multiple operating systems may thus be installed in the terminal device. However, it is found in practice that, to enable the terminal device to use different operating systems, setting by the user is often necessary. Consequently, the relationships of respective operations of the multiple operating systems and their coordination are relatively chaotic. Therefore, a great waste of power consumption may be caused, and the efficiency and flexibility when the terminal device runs different operating systems may also be reduced.

SUMMARY OF THE DISCLOSURE

According to a first aspect of the present disclosure, a mode switching method performed by a terminal device is provided. At least a first operating system and a second operating system are installed in the terminal device. A power consumption of the first operating system in a normal operating state is greater than that of the second operating system in the normal operating state. The method includes: obtaining, in response to receiving a scenario change notification for the terminal device, target scenario information corresponding to a changed scenario; switching, in response to the target scenario information meeting a mode switching condition corresponding to the scenario change notification, the terminal device from the current operating mode that is currently in operation to the target operating mode. An operation state of the first operating system in the current operating mode is different from that of the first operating system in the target operating mode; and/or, an operation power consumption of the first operating system in the current operating mode is different from that of the first operating system in the target operating mode.

According to a second aspect of the present disclosure, a terminal device is provided. The terminal device includes a memory and a processor. At least a first operating system and a second operating system are installed in the terminal device. The power consumption of the first operating system in a normal operating state is greater than that of the second operating system in the normal operating state. The memory stores a computer program. The computer program, when being executed by the processor, enables the processor to implement a mode switching method. The method includes: obtaining, in response to receiving a scenario change notification for the terminal device, target scenario information corresponding to a changed scenario; and switching, in response to the target scenario information meeting a mode switching condition corresponding to the scenario change notification, the terminal device from a current operating mode that is currently in operation to a target operating mode. The operation state of the first operating system in the current operating mode is different from that of the first operating system in the target operating mode; and/or, an operation power consumption of the first operating system in the current operating mode is different from that of the first operating system in the target operating mode.

According to a third aspect of the present disclosure, a non-transitory computer-readable storage medium is provided. A computer program is stored in the computer-readable storage medium. The computer program, when being executed by the processor, implements a mode switching method. The mode switching method is performed by a terminal device. At least a first operating system and a second operating system are installed in the terminal device. The power consumption of the first operating system in a normal operating state is greater than that of the second operating system in the normal operating state. The mode switching method includes: obtaining, in response to receiving a scenario change notification for the terminal device, target scenario information corresponding to a changed scenario; and switching, in response to the target scenario information meeting a mode switching condition corresponding to the scenario change notification, the terminal device from a current operating mode that is currently in operation to a target operating mode. The operation state of the first operating system in the current operating mode is different from that of the first operating system in the target operating mode; and/or, an operation power consumption of the first operating system in the current operating mode is different from that of the first operating system in the target operating mode.

BRIEF DESCRIPTION OF THE DRAWINGS

To more clearly illustrate technical schemes in the present disclosure, the drawings required in the description of the embodiments will be briefly introduced below. Obviously, the drawings in the following description are only some embodiments of the present disclosure. Other drawings could occur to those of ordinary skills in the art based on these drawings without creative efforts.

DETAILED DESCRIPTION

Technical schemes in embodiments of the present disclosure will be described clearly and thoroughly in connection with accompanying drawing of the present disclosure. Obviously, the described embodiments are only a part of the embodiments, but not all of them. All other embodiments by a person of ordinary skills in the art based on embodiments of the present disclosure without creative efforts should all be within the protection scope of the present disclosure.

The terms of the present disclosure "comprise", "include" and any variations thereof are intended to indicate a non-exclusive inclusion, for example, a process, a method, a system, a product or an apparatus including a series of steps or units are not necessarily limited to those steps or units that are expressly listed, but may include other steps or units that are not expressly listed or inherent to the process, the method, the product or the apparatus.

A mode switching method, a mode switching apparatus, a terminal device and a storage medium are disclosed in the present disclosure. The present disclosure may automatically switch between different operating modes in response to the actual usage scenarios of the terminal device, so as to coordinate reasonable operations of multiple operating systems of the terminal device, which is beneficial to reduce power consumption of the terminal device, and to enhance the efficiency and flexibility of the terminal device to run different operating systems at the same time.

A detailed description will be given below in conjunction with the accompanying drawings.

Figure 1A:
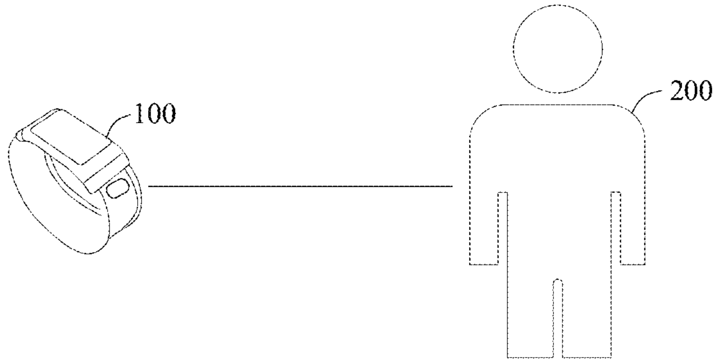
FIG. 1A is a schematic diagram of an application scenario of a mode switching method according to an embodiment of the present disclosure.
Figure 1B:
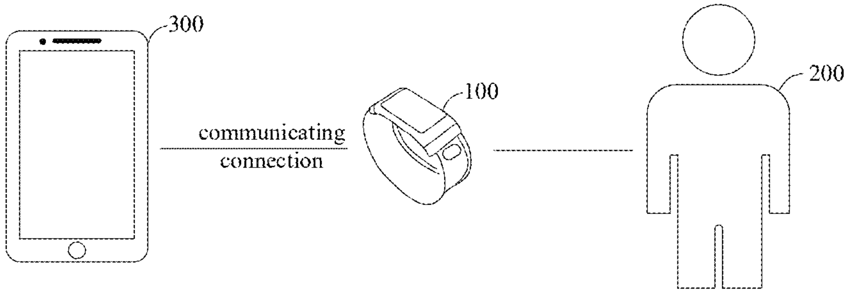
FIG. 1B is a schematic diagram of another application scenario of the mode switching method according to an embodiment of the present disclosure.

As illustrated in FIG. 1A and FIG. 1B, FIG. 1A is a schematic diagram of an application scenario of the mode switching method according to an embodiment of the present disclosure, and FIG. 1B is a schematic diagram of another application scenario of the mode switching method according to an embodiment of the present disclosure. As illustrated in FIG. 1A, this application scenario may include a terminal device 100 and a user 200. Multiple operating systems may be installed in the terminal device 100, such that in different usage scenarios, different function requirements of the user 200 for the terminal device 100 may be satisfied. In some embodiments, the terminal device 100 may determine, by monitoring its own current scenario, the scenario in which the user 200 actually uses the terminal device 100, and may further coordinate the operations of the multiple operating systems in a reasonable operating mode. In some other embodiments, as illustrated in FIG. 1B, the terminal device 100 may also establish a communicating connection with a target device 300, and determine the current scenario of the terminal device 100 through a communication with the target device 300, so as to realize the coordination of multiple operating systems.

Figure 2:
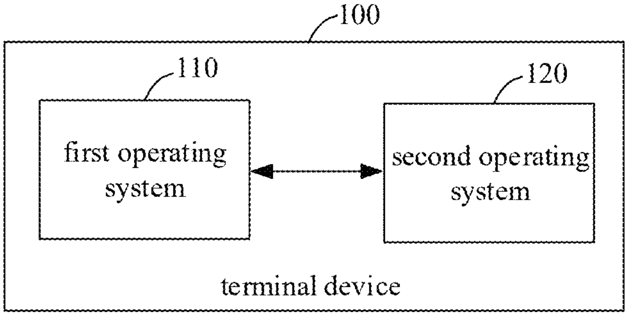
FIG. 2 is a modularized schematic diagram of the terminal device according to an embodiment of the present disclosure.

As an example, as illustrated in FIG. 2, at least a first operating system 110 and a second operating system 120 may be installed in the terminal device 100. The power consumption of the first operating system 110 in a normal operating state is greater than that of the second operating system 120 in the normal operating state.

In some embodiments, the terminal device 100 may be provided with at least two processing cores (i.e., a core of a processor). The two processing cores may be provided on two processors of the terminal device 100 respectively. In some embodiments, the two processing cores may be provided on a same processor (i.e., a multi-core processor). The two processing cores may be configured to run the first operating system 110 and the second operating system 120, respectively. Whether the first operating system 110 and the second operating system 120 are provided on a same processor, a direct or indirect connection pathway may be arranged between the processing cores where the first operating system 110 and the second operating system 120 are located respectively, such that the communicating connection may be established between the first operating system 110 and the second operating system 120, thereby facilitating realization of function coordination and an operating mode switching.

The above-mentioned processing core where the first operating system 110 is located may be a big core (i.e., a processor core with relatively versatile system function modules and relatively strong computing power). The big core is configured to run and implement various high-performance functions, including web browsing, audio and video calls, and running of some big-core applications, etc. The processing core where the second operating system 120 is located may be a small core (i.e., a processor core that supports relatively simple functions and with relatively weak computing power). The small core is configured to run and implement various basic functions, including sensor data collection, and running of some small-core applications, etc. By realizing the architecture of dual operating systems built on the big and small cores, the processor computing resources may be allocated according to different functional requirements of the user 200. In this way, the terminal device 100 may further automatically adjust resource allocation by switching between different operating modes. The terminal device 100 is thus facilitated to maintain good performance and low power consumption at the same time.

In some embodiments, more than two processing cores may also be provided in the terminal device 100 for installing more than two operating systems, respectively. Moreover, the terminal device 100 may automatically adjust the operating state of each operating system by switching between different operating modes through the terminal device 100 in a manner similar to the above-mentioned dual operating systems. In this way, it is beneficial to enhance the flexibility of the terminal device 100 when running the multiple operating systems.

In some embodiments of the present disclosure, the terminal device 100 may receive a scenario change notification for the terminal device 100, and determine, based on the scenario change notification, whether the scenario in which the terminal device 100 is located has changed. In some embodiments, the terminal device 100 may obtain the above-mentioned scenario change notification by listening to notifications. As an example, the above-mentioned notifications may include push notifications in operating systems such as Android, IOS etc. The above-mentioned notifications may also include broader broadcast notification messages, state notification messages etc. The state notification messages are, for example, notification messages related to the state of geographic locations, device connections, application program usage scenarios, etc. In some embodiments, a case in which the terminal device 100 has been installed with at least the above-mentioned first operating system 110 and the second operating system 120 is taken as an example. If the terminal device 100 receives the scenario change notification for the terminal device 100, a target scenario information corresponding to the changed scenario may be obtained. The target scenario information may be configured to characterize, in case the scenario in which the terminal device 100 is located has changed, a scenario characteristic of the scenario in which the terminal device 100 is currently located. Based on the above, in response to the above-mentioned target scenario information meeting a mode switching condition corresponding to the above-mentioned scenario change notification, the terminal device 100 may switch from a current operating mode that is currently in operation to a target operating mode. An operation state of the above-mentioned first operating system 110 in the current operating mode may be different from that of the first operating system 110 in the target operating mode, and an operation power consumption of the first operating system 110 in the current operating mode may also be different from that of the first operating system 110 in the target operating mode. In this way, the terminal device 100 may flexibly adjust its operating state in accordance with switching of its operating mode, thereby reducing overall power consumption of the terminal device 100 as much as possible.

As an example, each of the above-mentioned current operating mode and the target operating mode may include various types of operating modes in which the first operating system 110 and the second operating system 120 are in different operating states, respectively. The operating modes may be specifically classified, in particular by utilizing the operating state of the first operating system 110 installed in the big core as an indicator, into: a first operating mode in which the big core is in normal standby mode; a second operating mode (i.e., the flight mode) in which the big core disables a network communication function; a third operating mode in which the big core is hibernate (the memory is powered down); and a fourth operating mode in which the big core is sleeping (the memory remains powered), etc. The big core in the above-mentioned various types of operating modes or the operating states of the first operating system 110 are only examples. In some other embodiments, there may also exist other operating modes in which the operating states of the first operating system 110 and/or the second operating system 120 are different. The specific operating mode is not restricted in the present disclosure.

Figure 3A:
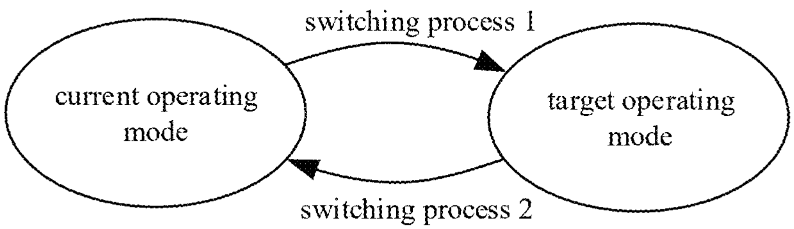
FIG. 3A is a schematic diagram of a mode switching process performed by the terminal device according to an embodiment of the present disclosure.

In some embodiments, in a case in which the target scenario information obtained by the terminal device 100 meets the mode switching condition corresponding to the scenario change notification, the terminal device 100 may realize a direct switching between the current operating mode and the target operating mode. As illustrated in FIG. 3A, the terminal device 100 may switch from the "current operating mode" to the "target operating mode" by performing a switching process 1 (hereinafter abbreviated as a "process 1"). During this process 1, the above-mentioned first operating system 110 and the second operating system 120 may perform corresponding specific operations. For example, when switching from the above-mentioned first operating mode to the second operating mode, the first operating system 110 may perform specific operations including, but not limited to, disabling the network communication function, etc., so as to bring the terminal device 100 into the "flight mode". In some embodiments, the above-mentioned mode switching process may also be performed in reverse order. That is, the terminal device 100 may switch from the "target operating mode" to the "current operating mode" by performing a switching process 2 (hereinafter abbreviated as a "process 2"). For example, when switching from the above-mentioned second operating mode to the first operating mode, the first operating system 110 may also perform specific operations including, but not limited to, enabling the network communication function, etc., so as to bring the terminal device 100 to exit the "flight mode".

Figure 3B:
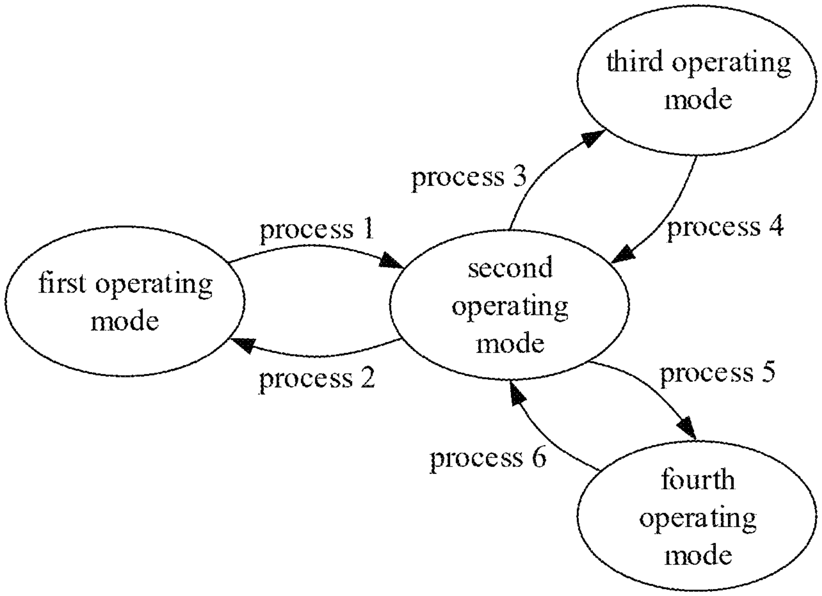
FIG. 3B is another schematic diagram of the mode switching process performed by the terminal device according to an embodiment of the present disclosure.

In some other embodiments, the terminal device 100 may also implement an indirect switch between the current operating mode and the target operating mode via a transition operating mode. The transition operating mode is similar to the above-mentioned current operating mode and the target operating mode, and may also include various types of operating modes in which the first operating system 110 and the second operating system 120 are in different operating states, respectively. As an example, in the case in which the target scenario information obtained by the terminal device 100 meets the mode switching condition corresponding to the scenario change notification, the terminal device 100 may first switch from the current operating mode to the transition operating mode, and then switch from the transition operating mode to the target operating mode. As illustrated in FIG. 3B, taking the above-mentioned mutual switching among the first operating mode, the second operating mode, the third operating mode, and the fourth operating mode as an example. In a case in which the terminal device 100 is required to switch from the first operating mode to the third operating mode or the fourth operating mode, as well as in another case in which the terminal device 100 is required to switch from the third operating mode or the fourth operating mode to the first operating mode, the second operating mode (i.e., "the flight mode") may be used as the transition operating mode in both cases. In this way, specific operations such as enabling or disabling the network communication function that are required to be performed during the mode switching process may be realized through the second operating mode, thereby enhancing the stability and the reliability of the mode switching process.

As a specific example, the terminal device 100 may switch from the first operating mode to the third operating mode by successively executing the "process 1" and a "process 3", with the second operating mode as a transition mode. Alternatively, the terminal device 100 may switch from the first operating mode to the fourth operating mode by successively executing the "process 1" and a "process 5", also with the second operating mode as a transition mode. In this way, the terminal device 100 may be switched from the first operating mode to the fourth operating mode. In some embodiments, the above-mentioned mode switching process may also be performed in a reverse order. In other words, the terminal device 100 may switch from the third operating mode to the second operating mode, and then to the first operating mode by successively executing a "process 4" and the "process 2". Alternatively, the terminal device 100 may switch from the fourth operating mode to the second operating mode, and then to the first operating mode by successively executing a "process 6" and the "process 2".

By implementing the above-mentioned mode switching method, the terminal device 100 may automatically switch between different operating modes in response to its own actual usage scenarios, and may further coordinate the first operating system 110 and the second operating system 120 on the terminal device 100 based on different operating modes, such that the respective operating states of the first operating system 110 and the second operating system 120 in the target operating mode may both match or conform with the above-mentioned actual usage scenario. This kind of mode switching method may be beneficial to coordinate reasonable operations of multiple operating systems of the terminal device 100, and adjust the operating state of the terminal device in time with the switching of the operating modes. In this way, the overall power consumption of the terminal device 100 may be reduced as much as possible. Meanwhile, the operation of each operating system may be provided with a compatible operating environment, and it is beneficial to enhance the efficiency and flexibility of the terminal device 100 to run different operating systems.

As an example, the above-mentioned terminal device 100 may include various types of devices or systems at least installed with dual operating systems, such as a cell phone, a smart wearable device, an in-vehicle terminal, a tablet computer, a personal computer (PC), a personal digital assistant (PDA), a TV, etc., which are not specifically restricted in the present disclosure. In some embodiments, the target device 300 that establishes a communicating connection with the terminal device 100 may include various types of devices or systems that include communication functions, which is not specifically restricted in the present disclosure. The terminal device 100 as illustrated in FIG. 1A and FIG. 1B is a watch. The target device 300 as illustrated in FIG. 1B is a cell phone. This is merely an example, and does not constitute a restriction to the device types of the terminal device 100 and the target device 300 in the present disclosure.

Figure 4:
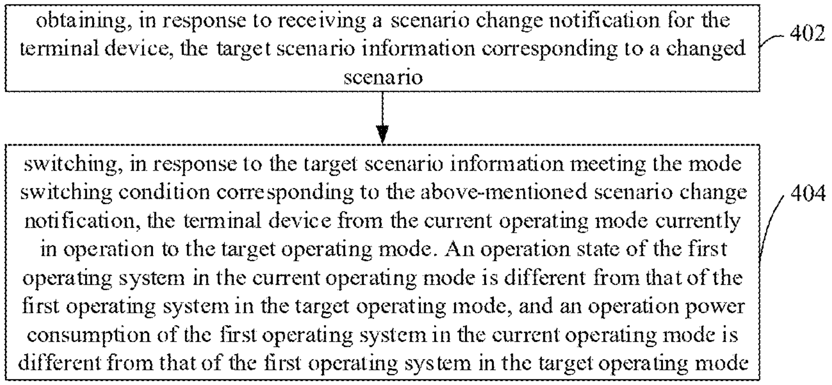
FIG. 4 is a schematic flowchart of a mode switching method according to an embodiment of the present disclosure.

As illustrated in FIG. 4, FIG. 4 is a schematic flowchart of the mode switching method according to an embodiment of the present disclosure. The mode switching method may be applied to the above-mentioned terminal device. At least a first operating system and a second operating system may be installed in the terminal device. The power consumption of the first operating system in the normal operating state is greater than that of the second operating system in the normal operating state. This mode switching method may include the following operations at blocks illustrated in FIG. 4.

In the operation of 402, obtaining, in response to receiving a scenario change notification for the terminal device, the target scenario information corresponding to a changed scenario.

In some embodiments of the present disclosure, the terminal device may adaptively adjust the operating mode of the terminal device based on the current scenario or the scenario in which the terminal device is currently located, such that in the adjusted operating mode, the respective operating states of the above-mentioned first operating system and the second operating system may both match the scenario in which the user actually uses the terminal device. In this way, the overall power consumption of the terminal device may be reduced as much as possible, while ensuring that the system functions required by the user are normally realized.

In order to determine the current scenario of the terminal device or the scenario in which the terminal device is currently located, the terminal device may receive the scenario change notification for the terminal device, and determine the scenario in which the terminal device is actually located base on the scenario change notification. In some embodiments, the terminal device may determine whether the scenario in which the terminal device is located has changed by listening to notifications. In response to determining that the scenario has changed, the terminal device performs a corresponding response. As a specific example, the terminal device may utilize various types of listeners to implement the above-mentioned listening. The listener may be a variety of interface programs that have the listening function or, more generally, have the functions of receiving notification messages. In response to listening to the scenario change notification for the terminal device via the above-mentioned listener, the terminal device may further obtain the target scenario information corresponding to the changed scenario. The target scenario information may be configured to characterize the scenario characteristic of the scenario in which the terminal device is currently located, so as to be used by the terminal device to recognize and confirm the scenario in which the terminal device is currently located. The target scenario information includes a current geographic location of the terminal device, a connection state between the terminal device and the target device, the state of using application programs, and whether the terminal device is in a specified scenario actively set by the user or detected by the terminal device, and other types of actual usage scenarios, etc. The target scenario information may in turn to be used in a subsequent step for determining whether the terminal device needs to perform a corresponding operating mode switch.

As an example, the above-mentioned scenario change notification may include, without limitation, one or more of a geographic location notification, a device connection notification, an application program usage scenario notification, a user setting scenario notification, and a scenario detection notification etc.

The above-mentioned geographic location notification may include notification messages related to the geographic location of the terminal device, such as the positioning of the terminal device, whether the terminal device is in a specified location area (e.g., a school, a house, etc.), and a location relationship between the terminal device and the target device in communicating connection with each other, etc.

The above-mentioned device connection notification may include notification messages related to the connection state between the terminal device and the target device, such as whether the terminal device establishes or disconnects the communicating connection (e.g., a Bluetooth connection of the type BT, BLE, etc., a Wi-Fi connection, etc.) with the target device, etc.

The above-mentioned application program usage scenario notification may include notification messages related to usage states of the application programs installed in the terminal device, such as the usage states of the application programs such as a browser, a telephone, an alarm clock, a music player, a sports recorder, a navigator, etc. In some embodiments, the above-mentioned application program usage scenario notification may also include notification messages related to the usage states of the application programs installed in the target device, the target device is in communicating connection with the terminal device. The notification message is such as the usage state of an application program (e.g., an application program such as a music player, a navigator, etc.) that is installed in the target device and is configured to perform communication based on the communicating connection between the target device and the terminal device, such that the terminal device may transmit and receive the application data. The above-mentioned application programs installed in the terminal device may be configured to run on the first operating system (i.e., big-core application programs) or on the second operating system (i.e., small-core application programs).

The above-mentioned user setting scenario notification may include a notification message related to the user setting, such as a flight period, a sleeping period, a do-not-disturb mode, a focus mode, etc. that are set by the user.

The above-mentioned scenario detection notification may include a notification message related to a scenario change detected through various interface programs, such as a screen brightness change (e.g., a bright screen, a dark screen, etc.), a battery level change (e.g., a low battery level, a full battery level, etc.), a network state change (e.g., a weak network signal, a broken network, etc.), etc., of the terminal device. In some embodiments, the above-mentioned scenario detection notification may also include a notification message related to a scenario change detected by a sensor of the terminal device, such as the terminal device being in a flight state (e.g., detected and determined by a barometer, an accelerometer, etc.), a moving state (e.g., detected and determined by an accelerometer, a gyroscope, etc.), etc.

In some embodiments of the present disclosure, in order to receive the scenario change notification for the above-mentioned terminal device, it is possible to listen to both the terminal device itself and the target device in communicating connection with the terminal device. In this way, the actual situation of a change in the scenario in which the terminal device is located may be obtained as comprehensively and accurately as possible.

In some embodiments, the terminal device may listen to the scenario in which the terminal device itself is located by means of recognition, so as to obtain the scenario change notification for the terminal device. In some embodiments, the terminal device may perform the scenario recognition through built-in sensors. For example, the terminal device may recognize whether the user is on flight by the barometer, the accelerometer, etc., and recognize whether the user is in motion by the gyroscope, etc. In some other embodiments, the terminal device may also perform the scenario recognition by using a specified interface program. For example, the terminal device may recognize a scheduled flight text message via a text message recognition program, so as to determine whether the user is on flight. For another example, the terminal device may recognize the user's voice via a voice assistant, so as to determine the application program that the user is using or is required to use, and thus further determine whether the user is in a scenario such as shopping, sporting, food ordering, etc.

On this basis, the terminal device may be provided with a corresponding listener, so as to listen to the scenario change recognized by the terminal device through the above-mentioned recognition process. The listener may be a variety of interface programs that have the listening function or, more generally, have the function of receiving notification messages. Moreover, the terminal device may generate a corresponding scenario change notification based on the obtained recognition results, and thus may obtain the target scenario information corresponding to the changed scenario based on the scenario change notification.

Figure 5A:
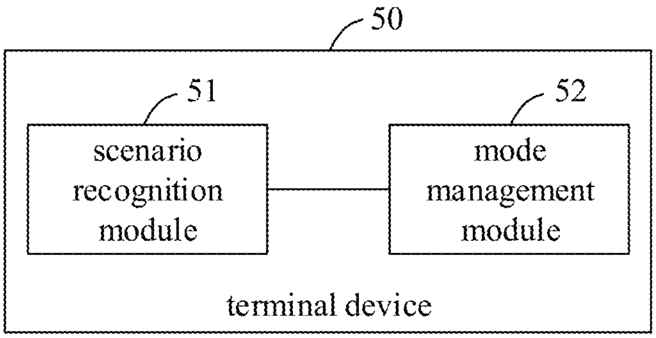
FIG. 5A is another modularized schematic diagram of the terminal device according to an embodiment of the present disclosure.

As an example, the above-mentioned listener may be implemented by a scenario recognition module of the terminal device. As illustrated in FIG. 5A, FIG. 5A is a modularized schematic diagram of the terminal device according to an embodiment of the present disclosure. As illustrated in FIG. 5A, the terminal device 50 may include a scenario recognition module 51 and a mode management module 52. Taking the Android operating system as an example, the terminal device 50 may register the listener via the scenario recognition module 51, so as to perform listening of the scenario recognition results of the terminal device 50 by means of the listener, and to generate a corresponding scenario change notification. In the subsequent operations, the scenario recognition module 51 may trigger, based on this scenario change notification, the mode management module 52 to switch the terminal device 50 from the current operating mode currently in operation to the target operating mode.

In some other embodiments, the terminal device may also directly receive the scenario change notification sent from an active operating system. As an example, the above-mentioned active operating system may include an operating system of the terminal device that is in the normal operating state in the current operating mode, such as the first operating system and/or the second operating system. During operation, the active operating system may issue corresponding scenario change notifications based on various types of operating data. The operating data is for example, the battery level, the usage state of the big-core application programs, the usage state of the small-core application programs, and user-triggered operations, etc. On this basis, the terminal device may also be provided with a corresponding listener. In response to receiving the above-mentioned scenario change notification via the listener, a change in the scenario in which the terminal device is located may be determined, and then the target scenario information corresponding to the changed scenario may be determined based on the scenario change notification.

As an example, the above-mentioned listener may also be implemented by the scenario recognition module 51 of the terminal device 50 as illustrated in FIG. 5. In other words, the terminal device 50 may register the listener via the scenario recognition module 51, so as to perform listening of the scenario change notification sent from the active operating system of the terminal device 50 by means of the listener. In the subsequent operations, the mode management module 52 may be triggered, based on this scenario change notification, to switch the terminal device 50 from the current operating mode currently in operation to the target operating mode.

In some other embodiments, the terminal device may establish the communicating connection with the target device, and utilize this target device to determine whether the scenario in which the terminal device is located has changed. As an example, in response to receiving the scenario change notification sent from the above-mentioned target device, the terminal device may obtain, based on the scenario change notification, the target scenario information corresponding to the changed scenario. In some embodiments, the target device may recognize the scenario in which the target device itself is located, and synchronize the recognition results to the terminal device, such that the terminal device may use the recognition results received by itself as the scenario change notification. In some other embodiments, the target device may also send a specified control instruction (e.g., an instruction of listening to music, an instruction of entering the flight mode, an instruction of entering the sleeping mode, etc.) to the terminal device. In this way, the terminal device, while executing the control instruction, may take the control instruction as the scenario change notification, and apply the scenario change notification in the subsequent operation of obtaining the corresponding target scenario information.

Figure 5B:
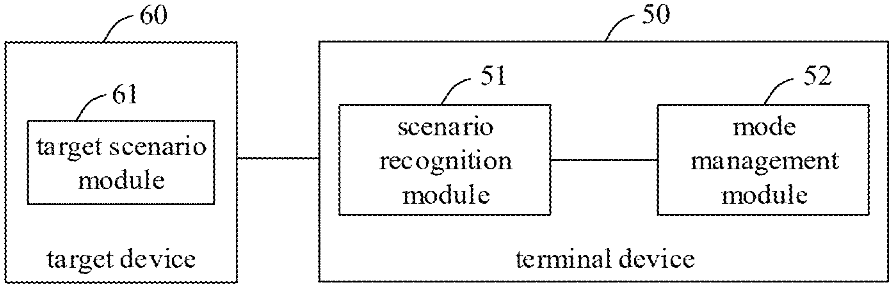
FIG. 5B is a modularized schematic diagram of the terminal device illustrated in FIG. 5A and a target device in communicating connection with the terminal device.

As an example, as illustrated in FIG. 5B, the terminal device 50 may include the scenario recognition module 51 and the mode management module 52. The target device 60 in communicating connection with the terminal device 50 may instead include a target scenario module 61. The target scenario module 61 may be configured to perform recognition on the scenario in which the target device 60 itself is located, and synchronize the recognition result to the terminal device 50. The target scenario module 61 may also be configured to send the specified control instruction to the terminal device 50, to cause the terminal device 50 to enter a specified usage scenario. On this basis, in response to the terminal device 50 receiving the scenario change notification sent from the target device 60 via the scenario recognition module 51 of the terminal device 50, it may be determined that the scenario in which the terminal device 50 is located has changed. In the subsequent operations, the scenario recognition module 51 may trigger, based on this scenario change notification, the mode management module 52 to switch the terminal device 50 from the current operating mode currently in operation to the target operating mode.

In some embodiments of the present disclosure, based on the received scenario change notification for the terminal device, the terminal device may comprehensively determine whether the scenario in which it is located has changed, so as to accurately determine the changed scenario in which the terminal device is currently located, and obtain the target scenario information corresponding to the changed scenario. On this basis, the terminal device may determine, in the subsequent step and based on the target scenario information, whether it is necessary to switch the terminal device to other suitable operating modes, so as to realize targeted adjustment of the respective operating states of the first operating system and the second operating system.

In the operation of 404, switching, in response to the target scenario information meeting the mode switching condition corresponding to the above-mentioned scenario change notification, the terminal device from the current operating mode currently in operation to the target operating mode. An operation state of the first operating system in the current operating mode is different from that of the first operating system in the target operating mode, and an operation power consumption of the first operating system in the current operating mode is different from that of the first operating system in the target operating mode.

In some embodiments of the present disclosure, after the obtaining, in response to the change of the scenario in which the terminal device is located, the target scenario information corresponding to the changed scenario, the terminal device may further determine whether the target scenario information meets the mode switching condition corresponding to the above-mentioned scenario change notification, and accordingly determine whether to switch the terminal device from the current operating mode to the target operating mode.

Different scenario change notifications may correspond to different mode switching conditions. That is, the terminal device may determine a mode switching condition to be further judged by itself based on the types, specific contents, etc., of the received scenario change notification. The type of the scenario change notification is, for example, the above-mentioned geographic location notification, the device connection notification, the application program usage scenario notification, the user setting scenario notification, and the scenario detection notification, etc. The mode switching condition may be configured to determine whether the terminal device meets the requirements for switching from the current operating mode to the target operating mode. As an example, the target operating mode may include any one of the above-mentioned first operating mode, the second operating mode, the third operating mode, and the fourth operating mode. In addition, the target operating mode corresponds to the above-mentioned mode switching condition and is not the current operating mode of the terminal device. On this basis, in response to the target scenario information obtained by the terminal device meeting the mode switching condition corresponding to the above-mentioned scenario change notification, the terminal device may switch from the current operating mode to the target operating mode corresponding to the mode switching condition.

Each of the above-mentioned current operating mode and the target operating mode may include the first operating mode, the second operating mode, the third operating mode or the fourth operating mode. The first operating mode is configured that, both the first operating system and the second operating system are in the normal operating state. The second operating mode is configured that, the first operating system may disable the network communication function (i.e., in the "flight mode"), and the second operating system may be in the normal operating state. The third operating mode is configured that, the first operating system may be in a hibernate state in which the memory is powered down, and the second operating system is in the normal operating state. The fourth operating mode is configured that, the first operating system may be in a sleeping state where the power supply to the memory retains or the memory remains powered, and the second operating system is in the normal operating state.

In some embodiments, if the current operating mode of the terminal device includes the first operating mode, it is indicated that the first operating system and the second operating system of the terminal device are both in the normal operating state at this moment. On this basis, in response to the target scenario information obtained by the terminal device meeting the mode switching condition corresponding to the above-mentioned scenario change notification, and the current mode switching condition corresponding to the second operating mode, the terminal device may take the second operating mode as the target operating mode, such that the terminal device may switch from the first operating mode to the second operating mode.

As an example, in response to the terminal device receiving the scenario change notification for the terminal device while being in the first operating mode, the corresponding mode switching condition may include: whether the above-mentioned target scenario information indicates that the user is on flight. Specifically, for example, if the scenario change notification received by the terminal device is a message notification of a specified application program (e.g., a flight status notification, etc.), then the target scenario information obtained by the terminal device may indicate whether the corresponding flight has already taken off. For another example, if the scenario change notification received by the terminal device is an operating mode notification (e.g., a flight mode notification, etc.) actively set by the user, then the target scenario information obtained by the terminal device may indicate whether the user has actively set the terminal device into the flight mode. If it is determined through the above-mentioned target scenario information that the user is on flight, it may be confirmed that the target scenario information meets the corresponding mode switching condition. Further, in response to the above-mentioned target scenario information meeting the mode switching condition corresponding to the scenario change notification, since the mode switching condition at this moment corresponds to the second operating mode (i.e., the flight mode) of the terminal device, the terminal device may trigger its first operating system to disable the network communication function, so as to cause the terminal device to enter the second operating mode (the flight mode).

In some other embodiments, in response to the terminal device receiving the scenario change notification for the terminal device while being in the first operating mode, the corresponding mode switching condition may also include: whether the above-mentioned target scenario information indicates that the terminal device should enter the hibernate state or the sleeping state. Specifically, for example, if the scenario change notification received by the terminal device is a state notification of a specified application program (e.g., a launch notification of an application program that requires a small core to run for a long period of time, such as a running App, a fitness App, etc.), or an operating mode notification actively set by the user (e.g., the user sleeping mode, a specified sleeping period, etc.), the target scenario information obtained by the terminal device may all indicate that the terminal device should enter the hibernate mode where the memory is powered down. For another example, the scenario change notification received by the terminal device is the state notification of the specified application program (e.g., the launch notification of some application programs that require to be run by the small core in the background, etc.), or a screen-off scenario detection notification (i.e., the terminal device is detected to be screen-off in timeout or is set to be screen-off), etc., the target scenario information obtained by the terminal device may all indicate that the terminal device should enter the sleeping mode where the memory remain powered. In response to determining that the terminal device should enter the hibernate state or the sleeping state based on the above-mentioned target scenario information, it may be confirmed that, the target scenario information meets a corresponding hibernate mode switching condition or a corresponding sleeping mode switching condition. Further, the terminal device may take the third operating mode or the fourth operating mode corresponding to the mode switching condition at this moment as the target operating mode, such that the terminal device may switch from the first operating mode to the corresponding third operating mode or the corresponding fourth operating mode.

The terminal device may directly switch from the first operating mode to the corresponding third operating mode or the corresponding fourth operating mode. The terminal device may also first switch from the first operating mode to the second operating mode, so as to disable the network communication function corresponding to the first operating system, and then switch from the second operating mode to the third operating mode or the fourth operating mode. Such a mode switching method is beneficial for an explicit division of the system functions that require to be enabled or disabled in different operating modes, and helps to improve the orderliness of the mode switching process, thereby further enhancing the efficiency and reliability of the mode switching process.

In some other embodiments, the above-mentioned mode switching process may also be performed in reverse order. As an example, in response to the terminal device receiving the scenario change notification for the terminal device while being in the second operating mode, the corresponding mode switching condition may include: whether the above-mentioned target scenario information indicates that the user has ended the flight state. Specifically, for example, if the scenario change notification received by the terminal device is the flight state notification, the target scenario information obtained by the terminal device may indicate whether the corresponding flight has already landed. For another example, if the scenario change notification received by the terminal device is the operating mode notification actively set by the user, the target scenario information obtained by the terminal device may indicate whether the user has actively exited the terminal device from the flight mode. In response to determining through the above-mentioned target scenario information that the user has ended the flight state, it may be confirmed that the target scenario information meets the corresponding mode switching conditions. In turn, the first operating mode corresponding to the current mode switching condition may be used as the target operating mode. The terminal device may perform a corresponding mode switching operation, to switch from the second operating mode to the first operating mode.

As another example, in response to the terminal device receiving the scenario change notification for the terminal device while being in the third operating mode or in the fourth operating mode, the corresponding mode switching condition may include: whether the above-mentioned target scenario information indicates that the terminal device should exit the hibernate state or the sleeping state. Specifically, for example, if the scenario change notification received by the terminal device is the state notification of a specified application program (e.g., an exit notification of an application program that requires a small core to run for a long period of time, such as a running App, a fitness App, etc.), or the operating mode notification actively set by the user (e.g., exiting from the user sleeping mode), or a specified sleeping period has ended, etc., the target scenario information obtained by the terminal device may all indicate that the terminal device should exit the hibernate mode where the memory is powered down. For another example, the scenario change notification received by the terminal device is the state notification of the specified application program (e.g., an exit notification of some application programs that require to be run by the small core in the background, etc.), or the screen-on scenario detection notification (i.e., the screen of the terminal device is detected to be screen-on or lit up), etc., the target scenario information obtained by the terminal device may all indicate that the terminal device should exit the sleeping mode where the memory remain powered. In response to determining, based on the above-mentioned target scenario information, that the terminal device should exit the hibernate state or the sleeping state, it may be confirmed that, the target scenario information meets the corresponding mode switching condition. In turn, the first operating mode corresponding to the current mode switching condition may be used as the target operating mode. The terminal device may also perform a corresponding mode switching operation, first switch from the third operating mode or the fourth operating mode switching to the second operating mode, then switch from the second operating mode to the first operating mode.

By implementing the mode switching method described in the above-mentioned embodiments, the terminal device may automatically switch between different operating modes in response to its own actual usage scenarios, and may further coordinate the first operating system and the second operating system on the terminal device based on different operating modes, such that the respective operating states of the first operating system and the second operating system in the target operating mode may both match the above-mentioned actual usage scenario. This kind of mode switching method may be conductive to coordinate reasonable operations of multiple operating systems of the terminal device, and adjust the operating state of the terminal device in time with the switching of the operating modes. In this way, the overall power consumption of the terminal device may be reduced as much as possible. Meanwhile, the operation of each operating system may be provided with a compatible operating environment, and it is beneficial to enhance the efficiency and flexibility of the terminal device to run different operating systems.

Figure 6:
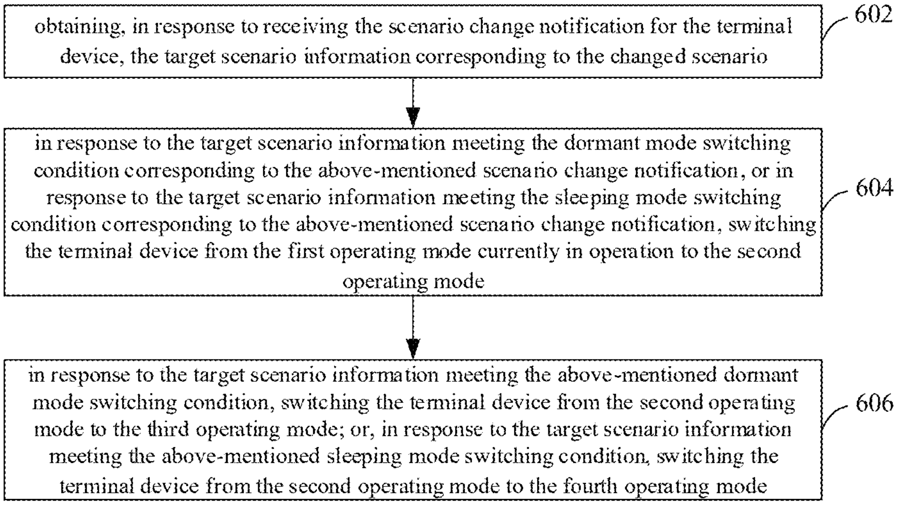
FIG. 6 is a schematic flowchart of another mode switching method according to an embodiment of the present disclosure.

As illustrated in FIG. 6, FIG. 6 is a schematic flowchart of another mode switching method according to an embodiment of the present disclosure. The mode switching method may be applied to the above-mentioned terminal device. At least the first operating system and the second operating system may be installed in the terminal device. The power consumption of the first operating system in the normal operating state is greater than that of the second operating system in the normal operating state. This mode switching method may include the following operations at blocks illustrated in FIG. 6.

In the operation of 602, obtaining, in response to receiving a scenario change notification for the terminal device, target scenario information corresponding to a changed scenario.

The operation of 602 is similar to the above-mentioned operation of 402, and will not be repeated here.

In the operation of 604, in response to the target scenario information meeting the hibernate mode switching condition corresponding to the above-mentioned scenario change notification, or in response to the target scenario information meeting the sleeping mode switching condition corresponding to the above-mentioned scenario change notification, switching the terminal device from the first operating mode currently in operation to the second operating mode.

In some embodiments of the present disclosure, in response to the change in the current scenario of the terminal device, the terminal device obtains the target scenario information corresponding to the changed scenario. In this way, the terminal device may further judge whether the target scenario information meets a certain target operating mode and the mode switching condition corresponding to the above-mentioned scenario change notification, and perform the corresponding mode switching operation when the mode switching condition is met. In response to the target scenario information meeting the hibernate mode switching condition corresponding to the above-mentioned scenario change notification, or in response to the target scenario information meeting the sleeping mode switching condition corresponding to the above-mentioned scenario change notification, the terminal device may take the second operating mode as the transition operating mode. The terminal device first switches from the first operating mode to the second operating mode, and in a subsequent step, the terminal device then switches from the second operating mode to the third operating mode or the fourth operating mode according to a condition actually met by the target scenario information and the specific target operating mode corresponding to this condition.

In response to the above-mentioned target scenario information only meeting the mode switching condition corresponding to the second operating mode, the terminal device may also only switch from the first operating mode to the second operating mode without performing the subsequent switching steps.

As an example, during the process of switching from the first operating mode to the second operating mode, the terminal device may trigger the first operating system to disable the network communication function. In some embodiments, the terminal device may also first detect a network communication state (e.g., whether a calling service, a data traffic service, etc. is in progress) of the first operating system, and trigger, in response to the network communication state matching a target communication state corresponding to the second operating mode (i.e., the flight mode), the first operating system to disable the network communication function. By implementing the above-mentioned method, it may be ensured that, the user has already ended the corresponding service requirements before the terminal device enters the flight mode, thereby favorably avoiding an interruption of the service process of a calling, an Internet surfing, etc. being performed by the user, and enhancing the flexibility of the terminal device in performing the mode switching.

In the operation of 606, in response to the target scenario information meeting the above-mentioned hibernate mode switching condition, switching the terminal device from the second operating mode to the third operating mode; or, in response to the target scenario information meeting the above-mentioned sleeping mode switching condition, switching the terminal device from the second operating mode to the fourth operating mode.

In some embodiments of the present disclosure, since the terminal device needs to use the second operating mode as the transition operating mode in the process of switching from the first operating mode to the third operating mode or to the fourth operating mode, thus after switching to the second operating mode, the terminal device may determine whether to cause itself to enter into the sleeping mode or the hibernate state in accordance with the actual usage condition thereof, so as to distinguish between switching to the third operating mode or switching to the fourth operating mode.

In some embodiments, in response to the above-mentioned target scenario information meeting the hibernate mode switching condition corresponding to the third operating mode, the terminal device may switch from the second operating mode to the third operating mode. The mode switching operation performed during this process may be referenced to that illustrated in an operation of 702 to an operation of 706.

In some other embodiments, in response to the above-mentioned target scenario information meeting the sleeping mode switching condition corresponding to the fourth operating mode, the terminal device may switch from the second operating mode to the fourth operating mode. The mode switching operation performed during this process may be referenced to that illustrated in an operation of 802 to an operation of 806.

As an alternative embodiment, the terminal device, after switching itself from the first operating mode currently in operation to the second operating mode, may further detect the application program usage state of the first operating system, so as to judge whether the application program usage state matches a target usage state corresponding to the third operating mode or the fourth operating mode. As an example, the above-mentioned application program usage state may include: whether the application program for music, navigation, sports, etc. is in the usage state. The terminal device may determine, based on the application program usage state, whether the first operating system meets the hibernate condition or the sleeping condition. If the above-mentioned application program usage state matches the target usage state corresponding to the third operating mode or the fourth operating mode, it is indicated that, at this moment, the first operating system meets the condition of the hibernate state or the sleeping state, such that the subsequent mode switching operation of switching from the second operating mode to the third operating mode or the fourth operating mode may be continued.

Figure 7:
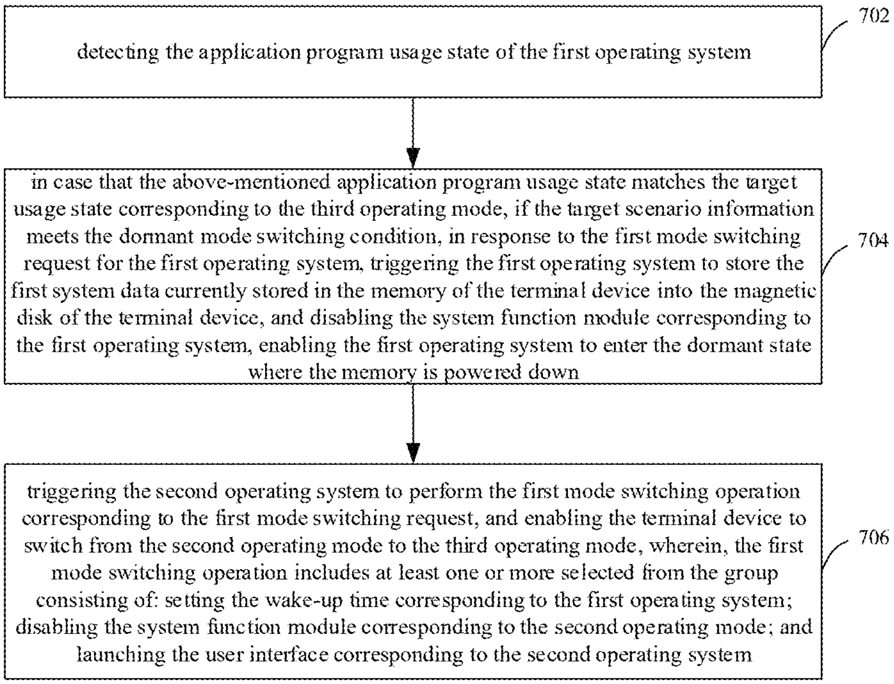
FIG. 7 is a schematic flowchart of yet another mode switching method according to an embodiment of the present disclosure.

During the process of performing the above-mentioned operation of 606, in response to the target scenario information meeting the above-mentioned hibernate mode switching condition, a specific implementation of the terminal device switching from the second operating mode to the third operating mode may be referred to FIG. 7. FIG. 7 is a schematic flowchart of yet another mode switching method according to an embodiment of the present disclosure. The mode switching method may include the following operations at blocks illustrated in FIG. 7.

In the operation of 702, detecting the application program usage state of the first operating system.

The operation of 702 is similar to a part of the embodiments of the above-mentioned operation of 606, and will not be repeated here.

In the operation of 704, in case that the above-mentioned application program usage state matches the target usage state corresponding to the third operating mode, if the target scenario information meets the hibernate mode switching condition, in response to a first mode switching request for the first operating system, triggering the first operating system to store a first system data currently stored in the memory of the terminal device into a magnetic disk of the terminal device, and disabling a system function module corresponding to the first operating system, such that the first operating system enters into the hibernate state where the memory is powered down.

The above-mentioned first system data is configured to be read from the magnetic disk and written into the memory by the first operating system in response to a restoration of power supply to the memory, such that the terminal device may be restored to its previous usage state.

As an example, the system function module corresponding to the above-mentioned first operating system may include a subsystem, a peripheral, a system main power supply etc. corresponding to the first operating system.

In some embodiments of the present disclosure, the terminal device may judge whether the application program usage state of a specified application program (e.g., an application program for music, navigation, sports, etc.) of the first operating system matches the target usage state corresponding to the third operating mode, so as to determine whether the first operating system of the terminal device meets a hibernate condition. In some embodiments, the terminal device may detect, in response to having switched to the second operating mode, the application program usage state of the above-mentioned first operating system, and judge the application program usage state. In some other embodiments, the terminal device may also detect in advance, in response to being in the first operating mode, the application program usage state of the above-mentioned first operating system and conduct a corresponding judgment. Therefore, after the terminal device has switched from the first operating mode to the second operating mode, the terminal device may immediately determine whether to continue switching to the third operating mode. In this way, the efficiency of the terminal device in performing the mode switching operation may be enhanced.

On this basis, in response to the above-mentioned application program usage state matching the target usage state corresponding to the third operating mode, and the target scenario information meeting the hibernate mode switching condition, the terminal device may send the first mode switching request to the first operating system. This first mode switching request is configured to trigger the first operating system to perform the above-mentioned operations such as the data storage, the system function module control, etc., so as to cause the first operating system to enter the hibernate state where the memory is powered down.

In the operation of 706, triggering the second operating system to perform a first mode switching operation corresponding to the first mode switching request, such that the terminal device switches from the second operating mode to the third operating mode. The first mode switching operation includes at least one or more selected from the group consisting of: setting a wake-up time corresponding to the first operating system; disabling the system function module corresponding to the second operating mode; and launching a user interface corresponding to the second operating system.

As an example, the system function module corresponding to the above-mentioned second operating mode may include a module that remains powered in the second operating mode, but may be hibernate in the third operating mode, such as a Bluetooth module, a Wi-Fi module etc.

It should be noted that, the above-mentioned operation of 704 as well as operation of 706 may be performed in a reverse order. In other words, the terminal device may also first trigger the second operating system to perform the first mode switching operation corresponding to the first mode switching request, and then notify the first operating system that the above-mentioned first mode switching operation has been completed. The terminal device may further trigger the first operating system to store the first system data currently stored in the memory of the terminal device into the magnetic disk of the terminal device, and disable the system function module corresponding to the first operating system.

Figure 8:
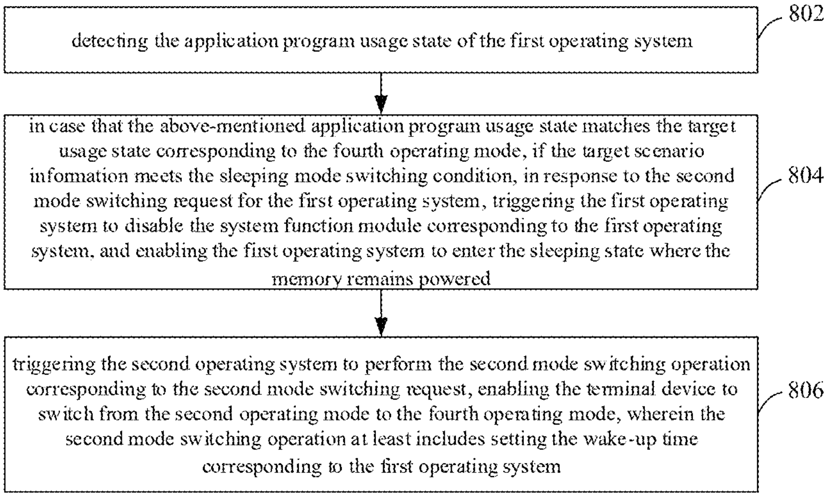
FIG. 8 is a schematic flowchart of a fourth mode switching method according to an embodiment of the present disclosure.

Further, during the process of performing the above-mentioned operation of 606, in response to the target scenario information meeting the above-mentioned sleeping mode switching condition, a specific implementation of the terminal device switching from the second operating mode to the fourth operating mode may be referred to FIG. 8. FIG. 8 is a schematic flowchart of a fourth mode switching method according to an embodiment of the present disclosure. The mode switching method may include the following operations at blocks illustrated in FIG. 8.

In the operation of 802, detecting the application program usage state of the first operating system.

The operation of 802 is similar to the above-mentioned operation of 702, and will not be repeated here.

In the operation of 804, in case that the above-mentioned application program usage state matches the target usage state corresponding to the fourth operating mode, if the target scenario information meets the sleeping mode switching condition, in response to a second mode switching request for the first operating system, triggering the first operating system to disable the system function module corresponding to the first operating system, enabling the first operating system to enter the sleeping state where the memory remains powered.

In the operation of 806, triggering the second operating system to perform a second mode switching operation corresponding to the second mode switching request, such that the terminal device switches from the second operating mode to the fourth operating mode. The second mode switching operation at least includes setting the wake-up time corresponding to the first operating system.

As an example, the system function module corresponding to the above-mentioned second operating mode may include a module that remain powered in the second operating mode, but may be hibernate in the fourth operating mode, such as the Bluetooth module, the Wi-Fi module etc.

In some embodiments of the present disclosure, the terminal device may judge whether the application program usage state of a specified application program (e.g., the application program for music, navigation, sports, etc.) of the first operating system matches the target usage state corresponding to the fourth operating mode, so as to determine whether the first operating system of the terminal device meets a sleeping condition. On this basis, in response to the above-mentioned application program usage state matching the target usage state corresponding to the fourth operating mode, and the target scenario information meeting the sleeping mode switching condition, the terminal device may send the second mode switching request to the first operating system. This second mode switching request is configured to trigger the first operating system to perform the above-mentioned operations such as the system function module control, etc., so as to cause the first operating system to enter the sleeping state where the memory remains powered.

The above-mentioned operation of 804 as well as the operation of 806 may be performed in a reverse order. In other words, the terminal device may also first trigger the second operating system to perform the second mode switching operation corresponding to the first mode switching request, and then notify the first operating system that the above-mentioned second mode switching operation has been completed. The terminal device may then further trigger the first operating system to disable the system function module corresponding to the first operating system.

By implementing the mode switching method described in the above-mentioned embodiments, the terminal device may automatically switch between different operating modes in response to its own actual usage scenarios, so as to coordinate reasonable operations of multiple operating systems of the terminal device, and adjust the operating state of the terminal device in time with the switching of the operating modes. In this way, the overall power consumption of the terminal device may be reduced as much as possible, Meanwhile, the operation of each operating system may be provided with a compatible operating environment, and it is beneficial to enhance the efficiency and flexibility of the terminal device to run different operating systems. In addition, by achieving mode jumping through the transition operating mode, it is beneficial for an explicit division of the system functions that require to be enabled or disabled in different operating modes, and helps to improve the orderliness of the mode switching process, thereby further enhancing the efficiency and reliability of the mode switching process.

Figure 9:
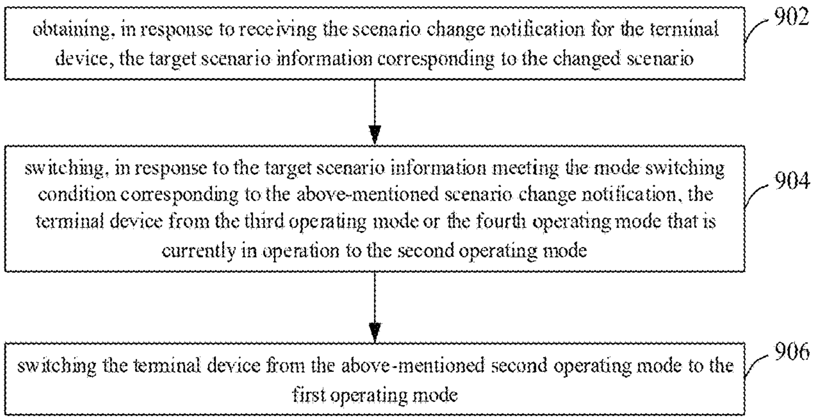
FIG. 9 is a schematic flowchart of a fifth mode switching method according to an embodiment of the present disclosure.

As illustrated in FIG. 9, FIG. 9 is a schematic flowchart of a fifth mode switching method according to an embodiment of the present disclosure. The mode switching method may be applied to the above-mentioned terminal device. At least the first operating system and the second operating system may be installed in the terminal device. The power consumption of the first operating system in the normal operating state is greater than that of the second operating system in the normal operating state. This mode switching method may include the following operations at blocks illustrated in FIG. 9.

In the operation of 902, obtaining, in response to receiving the scenario change notification for the terminal device, target scenario information corresponding to the changed scenario.

The operation of 902 is similar to the above-mentioned operation of 402, and will not be repeated here.

In the operation of 904, switching, in response to the target scenario information meeting the mode switching condition corresponding to the above-mentioned scenario change notification, the terminal device from the third operating mode or the fourth operating mode that is currently in operation to the second operating mode.

In some embodiments of the present disclosure, after obtaining, in response to the change of the scenario in which the terminal device is located, the target scenario information corresponding to the changed scenario, the terminal device may further judge whether the target scenario information meets the mode switching condition corresponding to the above-mentioned scenario change notification. The mode switching condition may correspond to the first operating mode of the terminal device. In response to the target scenario information meeting the mode switching condition corresponding to the above-mentioned scenario change notification, the terminal device may take the second operating mode as the transition operating mode, first switch from the third operating mode or the fourth operating mode in which the terminal device is currently operating to the second operating mode, and then switch from the second operating mode to the first operating mode in subsequent steps.

In response to the above-mentioned target scenario information only meeting the mode switching condition corresponding to the second operating mode, the terminal device may also only switch from the third operating mode or the fourth operating mode switching to the second operating mode without performing the subsequent switching operation.

As an example, in response to the above-mentioned target scenario information meeting the mode switching condition corresponding to the above-mentioned scenario change notification, and the first operating mode being taken as the target operating mode, the terminal device may trigger the second operating system, which is in the normal operating state, to wake up the first operating system.

In some embodiments, in response to the terminal device currently operating in the third operating mode (at this moment, the first operating system is in the hibernate state where the memory is powered down), the terminal device may trigger the first operating system to read second system data from the magnetic disk of the terminal device, to write the second system data into the memory of the terminal device, and to launch the system function module corresponding to the first operating system, so as to enable the terminal device to switch from the third operating mode to the second operating mode. The above-mentioned second system data is the data read from the memory and written to the magnetic disk by the first operating system before the memory was most recently powered down.

In some other embodiments, in response to this terminal device currently operating in the fourth operating mode (at this moment, the first operating system is in the sleeping state where the memory remains powered), the terminal device may trigger the first operating system to enable the system function module corresponding to the first operating system, such that the terminal device switches from the fourth operating mode to the second operating mode.

As an example, the system function module corresponding to the above-mentioned first operating system may include a subsystem, a peripheral, a system main power supply etc. corresponding to the first operating system.

In some embodiments, the terminal device may further trigger the second operating system thereon to implement a third mode switching operation. This third mode switching operation may include at least one or more selected from the group consisting of: unsetting the wake-up time corresponding to the first operating system; enabling the system function module corresponding to the second operating mode; and closing the user interface corresponding to the second operating system.

As an example, the system function module corresponding to the above-mentioned second operating mode may include a module that remains powered in the second operating mode, but may be powered down in the third operating mode or the fourth operating mode, such as the Bluetooth module, the Wi-Fi module etc.

In the operation of 906, switching the terminal device from the above-mentioned second operating mode to the first operating mode.

By implementing the mode switching method described in the above-mentioned embodiments, the terminal device may automatically switch between different operating modes in response to its own actual usage scenarios, so as to coordinate reasonable operations of multiple operating systems of the terminal device, and adjust the operating state of the terminal device in time with the switching of the operating modes. In this way, the overall power consumption of the terminal device may be reduced as much as possible, Meanwhile, the operation of each operating system may be provided with a compatible operating environment, and it is beneficial to enhance the efficiency and flexibility of the terminal device to run different operating systems. In addition, by achieving mode jumping through the transition operating mode, it is beneficial for an explicit division of the system functions that require to be enabled or disabled in different operating modes, and helps to improve the orderliness of the mode switching process, thereby further enhancing the efficiency and reliability of the mode switching process. In addition, by distinguishing between the third operating mode where the memory is powered down and the fourth operating mode where the memory remains powered, it may be possible to determine, based on the actual usage situation of the terminal device, whether to cause the terminal device to enter the sleeping state or the hibernate state. In this way, it is beneficial to reasonably reduce the power consumption of the terminal device and to further enhance the flexibility of the terminal device in performing the mode switching operations.

Figure 10:
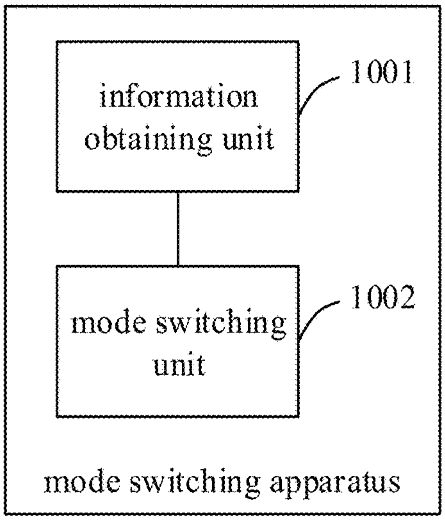
FIG. 10 is a modularized schematic diagram of a mode switching apparatus according to an embodiment of the present disclosure.

As illustrated in FIG. 10, FIG. 10 is a modularized schematic diagram of a mode switching apparatus according to an embodiment of the present disclosure. The mode switching apparatus may be applied to the above-mentioned terminal device. At least the first operating system and the second operating system may be installed in the terminal device. The power consumption of the first operating system in the normal operating state is greater than that of the second operating system in the normal operating state. As illustrated in FIG. 10, the mode switching apparatus may include an information obtaining unit 1001 and a mode switching unit 1002.

The information obtaining unit 1001 is configured to obtain, in response to receiving the scenario change notification for the terminal device, target scenario information corresponding to the changed scenario.

The mode switching unit 1002 is configured to switch, in response to the target scenario information meeting the mode switching condition corresponding to the above-mentioned scenario change notification, the terminal device from the current operating mode currently in operation to the target operating mode. The operation state of the first operating system in the current operating mode is different from that of the first operating system in the target operating mode and the operation power consumption of the first operating system in the current operating mode is different from that of the first operating system in the target operating mode.

By adopting the mode switching apparatus described in the above-mentioned embodiments, the terminal device may automatically switch between different operating modes in response to its own actual usage scenarios, and may further coordinate the first operating system and the second operating system on the terminal device based on different operating modes, such that the respective operating states of the first operating system and the second operating system in the target operating mode may both match the above-mentioned actual usage scenario. This kind of mode switching apparatus may be beneficial to coordinate reasonable operations of multiple operating systems of the terminal device, and adjust the operating state of the terminal device in time with the switching of the operating modes. In this way, the overall power consumption of the terminal device may be reduced as much as possible. Meanwhile, the operation of each operating system may be provided with a compatible operating environment, and it is beneficial to enhance the efficiency and flexibility of the terminal device to run different operating systems.

As an example, the above-mentioned scenario change notification may include one or more of the geographic location notification, the device connection notification, the application program usage scenario notification, the user setting scenario notification, and the scenario detection notification.

In some embodiments, the above-mentioned information obtaining unit 1001 may be specifically configured to: in response to receiving the scenario change notification sent from the target device in communicating connection with the terminal device, obtaining, based on the scenario change notification, the target scenario information corresponding to the changed scenario.

In some other embodiments, the above-mentioned information obtaining unit 1001 may also be specifically configured to: recognize a scenario in which the terminal device is located; generate, based on a recognition result, the scenario change notification; and, obtain, based on the scenario change notification, the target scenario information corresponding to the changed scenario.

In yet another embodiment, the above-mentioned information obtaining unit 1001 may also be specifically configured to: in response to receiving the scenario change notification sent from the active operating system, obtain, based on the scenario change notification, the target scenario information corresponding to the changed scenario. The active operating system includes one of the first operating system and the second operating system that is in the normal operating state in the current operating mode.

By adopting the above-mentioned mode switching apparatus, the terminal device is possible to listen to both the terminal device itself and the target device in communicating connection with the terminal device. In this way, the actual situation of the change in the scenario in which the terminal device is located may be obtained more comprehensively and more accurately, thereby enhancing the flexibility and accuracy of the adaptive mode switching of the terminal device.

As an example, each of the above-mentioned current operating mode and the target operating mode may include the first operating mode, the second operating mode, the third operating mode or the fourth operating mode. The first operating mode is configured that, both the first operating system and the second operating system are in the normal operating state. The second operating mode is configured that, the first operating system may disable the network communication function, and the second operating system may be in the normal operating state. The third operating mode is configured that, the first operating system may be in the hibernate state where the memory is powered down, and the second operating system is in the normal operating state. The fourth operating mode is configured that, the first operating system may be in the sleeping state where the memory remains powered, and the second operating system is in the normal operating state.

In some embodiments, the above-mentioned current operating mode may include the first operating mode, the target operating mode may include the second operating mode. In this case, the above-mentioned mode switching unit 1002 may be specifically configured to: in response to the target scenario information meeting the mode switching condition corresponding to the above-mentioned scenario change notification, triggering the first operating system to disable the network communication function, enabling the terminal device to switch from the first operating mode currently in operation to the second operating mode.

The above-mentioned operation of triggering, by the mode switching unit 1002, the first operating system to disable the network communication function may specifically include: detecting, in response to the target scenario information meeting the mode switching condition corresponding to the above-mentioned scenario change notification, the network communication state of the first operating system; and, triggering, in response to the network communication state matching a target communication state corresponding to the second operating mode, the first operating system to disable the network communication function.

In some embodiments, the above-mentioned current operating mode may include the second operating mode, the target operating mode may include the first operating mode. In this case, the above-mentioned mode switching unit 1002 may be specifically configured to: in response to the target scenario information meeting the mode switching condition corresponding to the above-mentioned scenario change notification, trigger the first operating system to enable the network communication function, and enable the terminal device to switch from the second operating mode currently in operation to the first operating mode.

In some embodiments, the above-mentioned current operating mode may include the first operating mode, the target operating mode may include the third operating mode or the fourth operating mode. In this case, the above-mentioned mode switching unit 1002 may be specifically configured to: in response to the target scenario information meeting the hibernate mode switching condition corresponding to the above-mentioned scenario change notification, or in response to the target scenario information meeting the sleeping mode switching condition corresponding to the above-mentioned scenario change notification, switch the terminal device from the first operating mode currently in operation to the second operating mode; in response to the target scenario information meeting the hibernate mode switching condition, switch the terminal device from the second operating mode to the third operating mode; or, in response to the target scenario information meeting the sleeping mode switching condition, switch the terminal device from the second operating mode to the fourth operating mode.

The above-mentioned operation of switching, by the mode switching unit 1002, the terminal device from the second operating mode to the third operating mode may specifically include: in case that the target scenario information meets the hibernate mode switching condition, in response to the first mode switching request for the first operating system, triggering the first operating system to store the first system data currently stored in the memory of the terminal device into the magnetic disk of the terminal device, and disabling the system function module corresponding to the first operating system, such that the first operating system enters the hibernate state where the memory is powered down. The first system data is configured to be read from the magnetic disk and written into the memory by the first operating system in response to the restoration of power supply to the memory; and, triggering the second operating system to perform the first mode switching operation corresponding to the first mode switching request, such that the terminal device switches from the second operating mode to the third operating mode. The first mode switching operation includes at least one or more selected from the group consisting of: setting the wake-up time corresponding to the first operating system; disabling the system function module corresponding to the second operating mode; and, launching a user interface corresponding to the second operating system.

The above-mentioned operation of switching, by the mode switching unit 1002, the terminal device from the second operating mode to the fourth operating mode may specifically include: in case that the target scenario information meets the sleeping mode switching condition, in response to the second mode switching request for the first operating system, triggering the first operating system to disable the system function module corresponding to the first operating system, such that the first operating system enters the sleeping state where the memory remains powered; and, triggering the second operating system to perform the second mode switching operation corresponding to the second mode switching request, such that the terminal device switches from the second operating mode to the fourth operating mode. The second mode switching operation at least includes: setting the wake-up time corresponding to the first operating system.

As an alternative embodiment, after switching the terminal device from the first operating mode currently in operation to the second operating mode, the mode switching unit 1002 may further be configured to: detect the application program usage state of the first operating system; in case that the application program usage state matches the target usage state corresponding to the third operating mode, in response to the target scenario information meeting the hibernate mode switching condition, switch the terminal device from the second operating mode to the third operating mode; or, in case that the application program usage state matches the target usage state corresponding to the fourth operating mode, in response to the target scenario information meeting the sleeping mode switching condition, switch the terminal device from the second operating mode to the fourth operating mode.

In some embodiments, the above-mentioned current operating mode may include the second operating mode, and the target operating mode may include the third operating mode or the fourth operating mode. In this case, the above-mentioned mode switching unit 1002 may be specifically configured to: in response to the target scenario information meeting the hibernate mode switching condition corresponding to the above-mentioned scenario change notification, switch the terminal device from the second operating mode currently in operation to the third operating mode; or, in response to the target scenario information meeting the sleeping mode switching condition corresponding to the above-mentioned scenario change notification, switching the terminal device from the second operating mode currently in operation to the fourth operating mode.

In some embodiments, the above-mentioned current operating mode may include the third operating mode or the fourth operating mode, and the target operating mode may include the first operating mode. In this case, the above-mentioned mode switching unit 1002 may be specifically configured to: switch, in response to the target scenario information meeting the mode switching condition corresponding to the above-mentioned scenario change notification, the terminal device from the third operating mode or the fourth operating mode currently in operation to the second operating mode; and switch the terminal device from the second operating mode to the first operating mode.

The above-mentioned operation of switching, by the mode switching unit 1002, the terminal device from the third operating mode or the fourth operating mode currently in operation to the second operating mode may specifically include: in response to the target scenario information meeting the mode switching condition corresponding to the above-mentioned scenario change notification, trigger the second operating system to wake up the first operating system; in response to the terminal device currently operating in the third operating mode, trigger the first operating system to read the second system data from the magnetic disk of the terminal device, to write the second system data into the memory of the terminal device, and to launch the system function module corresponding to the first operating system, such that the terminal device switches from the third operating mode to the second operating mode, wherein the second system data is the data read from the memory and written into the magnetic disk by the first operating system before the memory was most recently powered down; or, in response to the terminal device currently operating in the fourth operating mode, trigger the first operating system to enable the system function module corresponding to the first operating system, such that the terminal device switches from the fourth operating mode switching to the second operating mode.

As an alternative embodiment, after triggering the second operating system to wake up the first operating system, the mode switching unit 1002 may further be configured to: trigger the second operating system to perform the third mode switching operation. The third mode switching operation includes at least one or more selected from the group consisting of: unsetting the wake-up time corresponding to the first operating system; enabling the system function module corresponding to the second operating mode; and closing the user interface corresponding to the second operating system.

In some embodiments, the above-mentioned current operating mode may include the third operating mode or the fourth operating mode, and the target operating mode may include the second operating mode. In this case, the above-mentioned mode switching unit 1002 may be specifically configured to: in case that the target scenario information meets the mode switching condition corresponding to the above-mentioned scenario change notification, in response to the terminal device currently operating in the third operating mode, switch the terminal device from the third operating mode to the second operating mode; or, in case that the target scenario information meets the mode switching condition corresponding to the above-mentioned scenario change notification, in response to the terminal device currently operating in the fourth operating mode, switch the terminal device from the fourth operating mode to the second operating mode.

By adopting the mode switching apparatus described in the above-mentioned embodiments, the terminal device may automatically switch between different operating modes in response to the actual usage scenarios of the terminal device, so as to coordinate reasonable operations of multiple operating systems of the terminal device, and adjust the operating state of the terminal device in time with the switching of the operating modes. In this way, the overall power consumption of the terminal device may be reduced as much as possible, Meanwhile, the operation of each operating system may be provided with a compatible operating environment, and it is beneficial to enhance the efficiency and flexibility of the terminal device to run different operating systems. In addition, by achieving mode jumping through the transition operating mode, it is beneficial for the explicit division of the system functions that require to be enabled or disabled in different operating modes, and improving the orderliness of the mode switching process, thereby further enhancing the efficiency and reliability of the mode switching process. In addition, by distinguishing between the third operating mode where the memory is powered down and the fourth operating mode where the memory remains powered, it may be possible to determine, based on the actual usage situation of the terminal device, whether to cause the terminal device to enter the sleeping state or the hibernate state. In this way, it is beneficial to reasonably reduce the power consumption of the terminal device, and to further enhance the flexibility of the terminal device in performing the mode switching operations.

Figure 11:
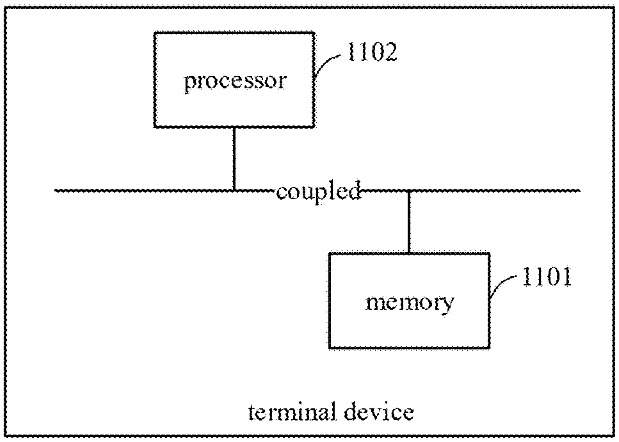
FIG. 11 is yet another modularized schematic diagram of the terminal device according to an embodiment of the present disclosure.

As illustrated in FIG. 11, FIG. 11 is a modularized schematic diagram of the terminal device according to an embodiment of the present disclosure. As illustrated in FIG. 11, this terminal device may include a memory 1101 and a processor 1102. The memory 1101 stores a computer program. This computer program, when being executed by the processor 1102, enables the processor 1102 to implement all or a part of the operations of any one mode switching method described in the above-mentioned embodiments.

In addition, a non-transitory computer-readable storage medium may be further provided in some embodiments of the present disclosure. The computer-readable storage medium stores a computer program configured for electronic data interchange. This computer program, when being executed by the processor, enables the processor to implement all or a part of the operations of any one mode switching method described in the above-mentioned embodiments. In addition, a computer program product is further provided in some embodiments of the present disclosure. This computer program product, when running on a computer, may enable the computer to implement all or a part of the operations of any one mode switching method described in the above-mentioned embodiments.

Those of ordinary skills in the art may appreciate that, all or a part of the operations of the various methods of the above-mentioned embodiments may be accomplished by the associated hardware being instructed by a program. The program may be stored in the computer-readable storage medium. The storage medium includes a read-only memory (ROM), a random access memory (RAM), a programmable read-only memory (PROM), an erasable programmable read only memory (EPROM), a one-time programmable read only memory (OTPROM), an electrically-erasable programmable read-only memory (EEPROM), a compact disc read-only memory (CD-ROM), another kind of optical disk memory, a magnetic disk memory, a magnetic tape memory or any other computer-readable medium that may be configured to carry or store data.

The mode switching method and apparatus, the terminal device, and the storage medium of the present disclosure has been disclosed in detail in the above. The principle and implementation of the present disclosure are illustrated in the present disclosure by means of specific embodiments. The illustrations of the above embodiments are only for facilitating the understanding the method and its core idea of the present disclosure. Meanwhile, specific implementation and its application scope may be changed by those of ordinary skills in the art based on the idea of the present disclosure. In summary, the contents of the specification should not be construed as a limitation to the present disclosure.

What is claimed is:

1. A mode switching method performed by a terminal device, at least a first operating system and a second operating system being installed in the terminal device, a power consumption of the first operating system in a normal operating state is greater than that of the second operating system in the normal operating state, wherein the method comprises:

obtaining, in response to receiving a scenario change notification for the terminal device, target scenario information corresponding to a changed scenario; and switching, in response to the target scenario information meeting a mode switching condition corresponding to the scenario change notification, the terminal device from a current operating mode that is currently in operation to a target operating mode, wherein an operation state of the first operating system in the current operating mode is different from that of the first operating system in the target operating mode, and/or an operation power consumption of the first operating system in the current operating mode is different from that of the first operating system in the target operating mode;

wherein, in response to the target scenario information meeting the mode switching condition corresponding to the scenario change notification, the switching the terminal device from a current operating mode that is currently in operation to a target operating mode, comprises at least one of cases I-IV;

in the case I, the current operating mode comprises a first operating mode, the target operating mode comprises a third operating mode or a fourth operating mode;

the switching, in response to the target scenario information meeting a mode switching condition corresponding to the scenario change notification, the terminal device from a current operating mode that is currently in operation to a target operating mode comprises:

switching the terminal device from the first operating mode that is currently in operation to a second operating mode; and switching the terminal device from the second operating mode to the third operating mode or the fourth operating mode;

the first operating mode is configured that, the first operating system and the second operating system are both in the normal operating state; the second operating mode is configured that, the first operating system disables a network communication function, and the second operating system is in the normal operating state; the third operating mode is configured that, the first operating system is in a hibernate state where a memory is powered down, and the second operating system is in the normal operating state; the fourth operating mode is configured that, the first operating system is in a sleeping state where the memory remains powered, and the second operating system is in the normal operating state;

in the case II, the current operating mode comprises a second operating mode, the target operating mode comprises a third operating mode or a fourth operating mode;

the second operating mode is configured that, the first operating system disables a network communication function, and the second operating system is in the normal operating state:

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in response to the target scenario information meeting a hibernate mode switching condition corresponding to the scenario change notification, switching the terminal device from the second operating mode that is currently in operation to the third operating mode; or in response to the target scenario information meeting a sleeping mode switching condition corresponding to the scenario change notification, switching the terminal device from the second operating mode that is currently in operation to the fourth operating mode;

in the case III, the current operating mode comprises a third operating mode or a fourth operating mode, the target operating mode comprises a first operating mode;

the first operating mode is configured that, the first operating system and the second operating system are both in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in response to the target scenario information meeting the mode switching condition corresponding to the scenario change notification, switching the terminal device from the third operating mode or the fourth operating mode that is currently in operation to the second operating mode, wherein, the second operating mode is configured that, the first operating system disables a network communication function, and the second operating system is in the normal operating state; and switching the terminal device from the second operating mode to the first operating mode;

in the case IV, the current operating mode comprises a third operating mode or a fourth operating mode, the target operating mode comprises a second operating mode, the second operating mode is configured that, the first operating system disables a network communication function, and the second operating system is in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in a case that the target scenario information meeting the mode switching condition corresponding to the scenario change notification, in response to the terminal device currently operating in the third operating mode, switching the terminal device from the third operating mode to the second operating mode; or in a case that the target scenario information meeting the mode switching condition corresponding to the scenario change notification, in response to the terminal device currently operating in the fourth operating mode, switching the terminal device from the fourth operating mode to the second operating mode.

2. The method as claimed in claim 1, wherein the obtaining, in response to receiving the scenario change notification for the terminal device, the target scenario information corresponding to the changed scenario comprises:

in response to receiving the scenario change notification sent from a target device in communicating connection with the terminal device, obtaining, based on the scenario change notification, the target scenario information corresponding to the changed scenario.

3. The method as claimed in claim 1, wherein the obtaining, in response to receiving the scenario change notification for the terminal device, the target scenario information corresponding to the changed scenario comprises:

recognizing a scenario in which the terminal device is located;

generating, based on a recognition result, the scenario change notification; and, obtaining, based on the scenario change notification, the target scenario information corresponding to the changed scenario.

4. The method as claimed in claim 1, wherein the obtaining, in response to receiving the scenario change notification for the terminal device, the target scenario information corresponding to the changed scenario comprises:

in response to receiving the scenario change notification sent from an active operating system, obtaining, based on the scenario change notification, the target scenario information corresponding to the changed scenario, wherein the active operating system comprises one of the first operating system and the second operating system that is in the normal operating state in the current operating mode.

5. The method as claimed in claim 1, wherein the scenario change notification comprises one or more of a geographic location notification, a device connection notification, an application program usage scenario notification, a user setting scenario notification, and a scenario detection notification.

6. The method as claimed in claim 1, wherein the current operating mode comprises a first operating mode, and the target operating mode comprises a second operating mode; the first operating mode is configured that, the first operating system and the second operating system are both in the normal operating state; the second operating mode is configured that, the first operating system disables a network communication function, and the second operating system is in the normal operating state;

the switching, in response to the target scenario information meeting the mode switching condition corresponding to the scenario change notification, the terminal device from the current operating mode that is currently in operation to the target operating mode comprises:

triggering, in response to the target scenario information meeting the mode switching condition corresponding to the scenario change notification, the first operating system to disable the network communication function, enabling the terminal device to switch from the first operating mode that is currently in operation to the second operating mode.

7. The method as claimed in claim 6, wherein the triggering, in response to the target scenario information meeting the mode switching condition corresponding to the scenario change notification, the first operating system to disable the network communication function comprises:

detecting, in response to the target scenario information meeting the mode switching condition corresponding to the scenario change notification, a network communication state of the first operating system; and triggering, in response to the network communication state matching a target communication state corresponding to the second operating mode, the first operating system to disable the network communication function.

8. The method as claimed in claim 1, wherein the current operating mode comprises a second operating mode, the target operating mode comprises a first operating mode;

the first operating mode is configured that, the first operating system and the second operating system are both in the normal operating state;

the second operating mode is configured that, the first operating system disables a network communication function, and the second operating system is in the normal operating state;

the switching, in response to the target scenario information meeting the mode switching condition corresponding to the scenario change notification, the terminal device from the current operating mode that is currently in operation to the target operating mode comprises:

triggering, in response to the target scenario information meeting the mode switching condition corresponding to the scenario change notification, the first operating system to enable the network communication function, enabling the terminal device to switch from the second operating mode that is currently in operation to the first operating mode.

9. The method as claimed in claim 1, wherein in the case I, the in response to the target scenario information meeting the hibernate mode switching condition, switching the terminal device from the second operating mode to the third operating mode comprises:

in a case that the target scenario information meets the hibernate mode switching condition, in response to a first mode switching request for the first operating system, triggering the first operating system to store a first system data currently stored in the memory of the terminal device into a magnetic disk of the terminal device, and disabling a system function module corresponding to the first operating system, enabling the first operating system to enter into the hibernate state where the memory is powered down, wherein the first system data is configured to be read from the magnetic disk and written to the memory by the first operating system in response to restoration of power supply to the memory; and triggering the second operating system to perform a first mode switching operation corresponding to the first mode switching request, enabling the terminal device to switch from the second operating mode to the third operating mode;

wherein the first mode switching operation comprises at least one or more selected from a group consisting of: disabling the system function module corresponding to the second operating mode, and launching a user interface corresponding to the second operating system.

10. The method as claimed in claim 1, wherein in the case I, the in response to the target scenario information meeting the sleeping mode switching condition, switching the terminal device from the second operating mode to the fourth operating mode comprises:

in a case that the target scenario information meets the sleeping mode switching condition, in response to a second mode switching request for the first operating system, triggering the first operating system to disable the system function module corresponding to the first operating system, enabling the first operating system to enter the sleeping state where the memory remains powered; and triggering the second operating system to perform a second mode switching operation corresponding to the second mode switching request, enabling the terminal device to switch from the second operating mode to the fourth operating mode.

11. The method as claimed in claim 1, wherein in the case I, after the in response to the target scenario information meeting the hibernate mode switching condition corresponding to the scenario change notification, or in response to the target scenario information meeting the sleeping mode switching condition corresponding to the scenario change notification, switching the terminal device from the first operating mode that is currently in operation to the second operating mode, the method further comprises:

detecting an application program usage state of the first operating system;

the in response to the target scenario information meeting the hibernate mode switching condition, switching the terminal device from the second operating mode to the third operating mode comprises:

in a case that the application program usage state matches the target usage state corresponding to the third operating mode, in response to the target scenario information meeting the hibernate mode switching condition, switching the terminal device from the second operating mode to the third operating mode; or the in response to the target scenario information meeting the sleeping mode switching condition, switching the terminal device from the second operating mode to the fourth operating mode comprises:

in a case that the application program usage state matches the target usage state corresponding to the fourth operating mode, in response to the target scenario information meeting the sleeping mode switching condition, switching the terminal device from the second operating mode to the fourth operating mode.

12. The method as claimed in claim 1, wherein in the case III, the in response to the target scenario information meeting the mode switching condition corresponding to the scenario change notification, switching the terminal device from the third operating mode or the fourth operating mode that is currently in operation to the second operating mode comprises:

in response to the target scenario information meeting the mode switching condition corresponding to the scenario change notification, triggering the second operating system to wake up the first operating system;

in response to the terminal device currently operating in the third operating mode, triggering the first operating system to read second system data from a magnetic disk of the terminal device, to write the second system data into the memory of the terminal device, and to launch a system function module corresponding to the first operating system, to enable the terminal device to switch from the third operating mode to the second operating mode, wherein the second system data is data read from the memory and written into the magnetic disk by the first operating system before the memory was most recently powered down; or in response to the terminal device currently operating in the fourth operating mode, triggering the first operating system to enable the system function module corresponding to the first operating system, enabling the terminal device to switch from the fourth operating mode switching to the second operating mode.

13. The method as claimed in claim 12, wherein after the in response to the target scenario information meeting the mode switching condition corresponding to the scenario change notification, triggering the second operating system to wake up the first operating system, the method further comprises:

triggering the second operating system to perform a third mode switching operation, wherein the third mode switching operation comprises at least one or more selected from a group consisting of: enabling the system function module corresponding to the second operating mode; and closing a user interface corresponding to the second operating system.

14. A terminal device comprising a memory and a processor, at least a first operating system and a second operating system being installed in the terminal device, a power consumption of the first operating system in a normal operating state is greater than that of the second operating system in the normal operating state, wherein the memory stores a computer program, the computer program, when being executed by the processor, enables the processor to implement a mode switching method, the method comprises:

obtaining, in response to receiving a scenario change notification for the terminal device, target scenario information corresponding to a changed scenario; and switching, in response to the target scenario information meeting a mode switching condition corresponding to the scenario change notification, the terminal device from a current operating mode that is currently in operation to a target operating mode, wherein an operation state of the first operating system in the current operating mode is different from that of the first operating system in the target operating mode, and/or an operation power consumption of the first operating system in the current operating mode is different from that of the first operating system in the target operating mode;

wherein, in response to the target scenario information meeting the mode switching condition corresponding to the scenario change notification, the switching the terminal device from a current operating mode that is currently in operation to a target operating mode, comprises at least one of cases I-IV;

in the case I, the current operating mode comprises a first operating mode, the target operating mode comprises a third operating mode or a fourth operating mode;

the switching, in response to the target scenario information meeting a mode switching condition corresponding to the scenario change notification, the terminal device from a current operating mode that is currently in operation to a target operating mode comprises:

switching the terminal device from the first operating mode that is currently in operation to a second operating mode; and switching the terminal device from the second operating mode to the third operating mode or the fourth operating mode;

the first operating mode is configured that, the first operating system and the second operating system are both in the normal operating state; the second operating mode is configured that, the first operating system disables a network communication function, and the second operating system is in the normal operating state; the third operating mode is configured that, the first operating system is in a hibernate state where a memory is powered down, and the second operating system is in the normal operating state; the fourth operating mode is configured that, the first operating system is in a sleeping state where the memory remains powered, and the second operating system is in the normal operating state;

in the case II, the current operating mode comprises a second operating mode, the target operating mode comprises a third operating mode or a fourth operating mode;

the second operating mode is configured that, the first operating system disables a network communication function, and the second operating system is in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in response to the target scenario information meeting a hibernate mode switching condition corresponding to the scenario change notification, switching the terminal device from the second operating mode that is currently in operation to the third operating mode; or in response to the target scenario information meeting a sleeping mode switching condition corresponding to the scenario change notification, switching the terminal device from the second operating mode that is currently in operation to the fourth operating mode;

in the case III, the current operating mode comprises a third operating mode or a fourth operating mode, the target operating mode comprises a first operating mode;

the first operating mode is configured that, the first operating system and the second operating system are both in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in response to the target scenario information meeting the mode switching condition corresponding to the scenario change notification, switching the terminal device from the third operating mode or the fourth operating mode that is currently in operation to the second operating mode, wherein, the second operating mode is configured that, the first operating system disables a network communication function, and the second operating system is in the normal operating state; and switching the terminal device from the second operating mode to the first operating mode;

in the case IV, the current operating mode comprises a third operating mode or a fourth operating mode, the target operating mode comprises a second operating mode, the second operating mode is configured that, the first operating system disables a network communication function, and the second operating system is in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state:

the switching, in response to the target scenario information meeting the mode switching condition corresponding to the scenario change notification, the terminal device from the current operating mode that is currently in operation to the target operating mode comprises:

in a case that the target scenario information meeting the mode switching condition corresponding to the scenario change notification, in response to the terminal device currently operating in the third operating mode, switching the terminal device from the third operating mode to the second operating mode; or in a case that the target scenario information meeting the mode switching condition corresponding to the scenario change notification, in response to the terminal device currently operating in the fourth operating mode, switching the terminal device from the fourth operating mode to the second operating mode.

15. The terminal device as claimed in claim 14, wherein the obtaining, in response to receiving the scenario change notification for the terminal device, the target scenario information corresponding to the changed scenario comprises:

in response to receiving the scenario change notification sent from a target device in communicating connection with the terminal device, obtaining, based on the scenario change notification, the target scenario information corresponding to the changed scenario.

16. A non-transitory computer-readable storage medium storing a computer program, wherein the computer program, when being executed by a processor, is configured to implement a mode switching method performed by a terminal device, at least a first operating system and a second operating system being installed in the terminal device, a power consumption of the first operating system in a normal operating state is greater than that of the second operating system in the normal operating state, wherein the mode switching method comprises:

obtaining, in response to receiving a scenario change notification for the terminal device, target scenario information corresponding to a changed scenario; and switching, in response to the target scenario information meeting a mode switching condition corresponding to the scenario change notification, the terminal device from a current operating mode that is currently in operation to a target operating mode, wherein an operation state of the first operating system in the current operating mode is different from that of the first operating system in the target operating mode, and/or an operation power consumption of the first operating system in the current operating mode is different from that of the first operating system in the target operating mode;

wherein, in response to the target scenario information meeting the mode switching condition corresponding to the scenario change notification, the switching the terminal device from a current operating mode that is currently in operation to a target operating mode, comprises at least one of cases I-IV;

in the case I, the current operating mode comprises a first operating mode, the target operating mode comprises a third operating mode or a fourth operating mode;

the switching, in response to the target scenario information meeting a mode switching condition corresponding to the scenario change notification, the terminal device from a current operating mode that is currently in operation to a target operating mode comprises:

switching the terminal device from the first operating mode that is currently in operation to a second operating mode; and switching the terminal device from the second operating mode to the third operating mode or the fourth operating mode;

the first operating mode is configured that, the first operating system and the second operating system are both in the normal operating state; the second operating mode is configured that, the first operating system disables a network communication function, and the second operating system is in the normal operating state; the third operating mode is configured that, the first operating system is in a hibernate state where a memory is powered down, and the second operating system is in the normal operating state; the fourth operating mode is configured that, the first operating system is in a sleeping state where the memory remains powered, and the second operating system is in the normal operating state;

in the case II, the current operating mode comprises a second operating mode, the target operating mode comprises a third operating mode or a fourth operating mode;

the second operating mode is configured that, the first operating system disables a network communication function, and the second operating system is in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in response to the target scenario information meeting a hibernate mode switching condition corresponding to the scenario change notification, switching the terminal device from the second operating mode that is currently in operation to the third operating mode; or in response to the target scenario information meeting a sleeping mode switching condition corresponding to the scenario change notification, switching the terminal device from the second operating mode that is currently in operation to the fourth operating mode;

in the case III, the current operating mode comprises a third operating mode or a fourth operating mode, the target operating mode comprises a first operating mode;

the first operating mode is configured that, the first operating system and the second operating system are both in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in response to the target scenario information meeting the mode switching condition corresponding to the scenario change notification, switching the terminal device from the third operating mode or the fourth operating mode that is currently in operation to the second operating mode, wherein, the second operating mode is configured that, the first operating system disables a network communication function, and the second operating system is in the normal operating state; and switching the terminal device from the second operating mode to the first operating mode;

in the case IV, the current operating mode comprises a third operating mode or a fourth operating mode, the target operating mode comprises a second operating mode, the second operating mode is configured that, the first operating system disables a network communication function, and the second operating system is in the normal operating state;

the third operating mode is configured that, the first operating system is in a hibernate state where a memory is powered down, and the second operating system is in the normal operating state;

the fourth operating mode is configured that, the first operating system is in a sleeping state where the memory remains powered, and the second operating system is in the normal operating state;

the switching, in response to the target scenario information meeting the mode switching condition corresponding to the scenario change notification, the terminal device from the current operating mode that is currently in operation to the target operating mode comprises:

in a case that the target scenario information meeting the mode switching condition corresponding to the scenario change notification, in response to the terminal device currently operating in the third operating mode, switching the terminal device from the third operating mode to the second operating mode; or in a case that the target scenario information meeting the mode switching condition corresponding to the scenario change notification, in response to the terminal device currently operating in the fourth operating mode, switching the terminal device from the fourth operating mode to the second operating mode.

* * * * *